United States Patent
Sasaki et al.

(10) Patent No.: US 7,226,987 B2
(45) Date of Patent: Jun. 5, 2007

(54) AROMATIC POLYMER PHOSPHONIC ACID DERIVATIVE AND PROCESS FOR PRODUCTION THE SAME

(75) Inventors: Shigeru Sasaki, Tsukuba (JP); Arihiro Yashiro, Ibaraki (JP); Yasuaki Hidaka, Tsukuba (JP)

(73) Assignee: Sumitomo Chemical Company Limited, Osaka (JP)

( * ) Notice: Subject to any disclaimer, the term of this patent is extended or adjusted under 35 U.S.C. 154(b) by 23 days.

(21) Appl. No.: 10/844,493

(22) Filed: May 13, 2004

(65) Prior Publication Data

US 2004/0210007 A1    Oct. 21, 2004

Related U.S. Application Data

(63) Continuation of application No. 10/062,435, filed on Feb. 5, 2002, now abandoned.

(30) Foreign Application Priority Data

| Feb. 15, 2001 | (JP) | ............................. 2001-038116 |
| Apr. 24, 2001 | (JP) | ............................. 2001-125501 |
| Dec. 13, 2001 | (JP) | ............................. 2001-379819 |

(51) Int. Cl.
    C08G 79/02    (2006.01)
(52) U.S. Cl. .................... 528/398; 528/486; 528/487; 528/488
(58) Field of Classification Search ............... 528/398, 528/486, 487, 488
    See application file for complete search history.

(56) References Cited

U.S. PATENT DOCUMENTS

| 3,748,306 A | 7/1973 | Khattab |
| 4,008,191 A | 2/1977 | Jagur-Grodzinski et al. |
| 4,996,271 A | 2/1991 | Guiver et al. |
| 5,525,436 A | 6/1996 | Savinell et al. |
| 2003/0113605 A1 | 6/2003 | Hidaka et al. |

FOREIGN PATENT DOCUMENTS

| EP | 0 932 213 A1 | 7/1999 |
| JP | 09-87510 A | 3/1997 |
| JP | 09-110982 A | 4/1997 |
| JP | 11-503262 A | 3/1999 |
| JP | 2000-11755 A | 1/2000 |
| JP | 2000-11756 A | 1/2000 |
| JP | 2001-118591 A | 4/2001 |
| JP | 2002-146016 A | 5/2002 |
| JP | 2002-241493 A | 8/2002 |
| JP | 2002-319414 A | 10/2002 |
| WO | WO 00/66254 A1 | 11/2000 |

OTHER PUBLICATIONS

Suzuki et al., Solid polymer electrolyte having high durability; Jun. 2001; Chem. Abstract 135:62388.
Sada et al., Manufacture of aromatic polymeric cation exchangers; Jan. 1989; Chem. Abstract 111:98651.
Meng et al., "Synthesis and Proton Conductivities of Phosphonic Acid Containing Poly-(arylene ether)s", *Journal of Polymer Science*, Polymer Chemistry Edition, vol. 39, No. 19, Oct. 1, 2001, XP-001096870, pp. 3218-3226.
Djerassi, "Brominations with N-Bromosuccinimide and Related Compounds The Wohl-Ziegler Reaction", Chemical Reviews, American Chemical Society, 1984, pp. 271-317.
Carreno et al., "N-Bromosuccinimide in Acetonitrile: A Brominating Reagent for Methoxybenzenes and Naphthalenes", Journal of Organic Chemistry, American Chemistry Society, vol. 60, No. 16, Aug. 11, 1995, pp. 5328-5331.
Guiver et al., "Functional group polysulfones by bromination-metalation", Polymer, vol. 30, Jun. 1989, pp. 1137-1142.

*Primary Examiner*—Duc Truong
(74) *Attorney, Agent, or Firm*—Sughrue Mion, PLLC

(57) ABSTRACT

Provided is an aromatic polymer phosphonic acid derivative in which a phosphonic acid derivative group is directly bound to aromatic ring. Said aromatic polymer phosphonic acid derivative can be produced by brominating a specific aromatic polymer compound with a brominating agent, then acting thereon trialkyl phosphite in the presence of a nickel halide catalyst to give a phosphonic acid di-ester, and further, by hydrolyzing the di-ester. The aromatic polymer phosphonic acid derivative is excellent in radical resistance and used for a solid polymer type fuel cell.

15 Claims, No Drawings

AROMATIC POLYMER PHOSPHONIC ACID DERIVATIVE AND PROCESS FOR PRODUCTION THE SAME

This is a continuation of application Ser. No. 10/062,435 filed Feb. 5, 2002 now abandoned; the disclosure of which is incorporated herein by reference.

BACKGROUND OF THE INVENTION

1. Field of the Invention

The present invention relates to aromatic polymer phosphonic acid derivatives, and more precisely, aromatic polymer phosphonic acid derivatives having phosphonic acid derivative groups directly bound to aromatic rings, a process for the production thereof and a use of these compounds.

The present invention also relates to a process for brominating an aromatic polymer compound.

2. Description of the Related Art

Aromatic polymer phosphonic acid derivatives are useful as materials for solid polymer type (polymer electrolyte type) fuel cell or others. For example, polymers in which phosphonic acid derivative groups or the like are bound to aromatic rings through methylene groups have been proposed, and production of such polymers has also been proposed by halogenating methyl groups in poly(2,6-dimethyl-1,4-phenylene oxide) or the like and then reacting the product with a trialkyl phosphate (see, for example, JP-A-11-503262 and J. Appl. Poly. Sci., 18, 1974 (1969)).

However, a polymer in which phosphonic acid derivative groups or the like are directly bound to aromatic rings has not been known.

As the result of extensive studies on a process for producing polymers in which phosphonic acid derivative groups or the like are directly bound to aromatic rings, the present inventors have found the fact that polymers in which phosphonic acid derivative groups or the like are directly bound to aromatic rings can easily be produced by brominating a specific aromatic polymer compound, which is a polyether compound, with a brominating agent, then acting thereon trialkyl phosphate in the presence of a nickel halide catalyst to give a phosphonic acid di-ester, and further, by hydrolyzing the di-ester to give a phosphonic acid mono-ester, a phosphonic acid or others, and the fact that these aromatic polymer phosphonic acid derivatives are excellent in radical resistance required on a material for solid polymer type fuel cell. The present invention has been completed based on such facts.

SUMMARY OF THE INVENTION

The present invention provides an aromatic polymer phosphonic acid derivative, which is represented by the formula (2),

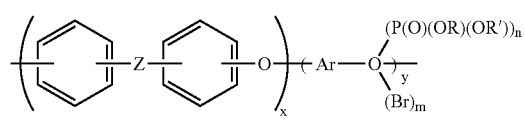
(2)

wherein -Z- represents —SO$_2$— or —CO—, x and y are average molar ratios in the polymer and respectively represent 0.01 to 0.99, provided that the sum of x and y is 1; —Ar— represents a divalent aromatic group having 4 to 18 carbon atoms which may contain hetero atom, and said —Ar— may have one or more substituents; R and R' each independently represent an alkyl group; m and n independently represent an average number of substituents per unit structure (—Ar—O—) of an aromatic polymer compound (1),

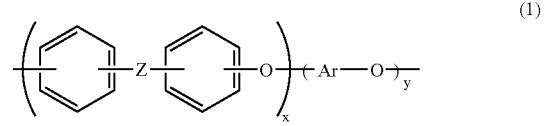
(1)

m is 0 to 8, n is a positive number of 8 or less, and the sum of m and n is 8 or less;

or an aromatic polymer phosphonic acid derivative whose free acid form is represented by the formula (3):

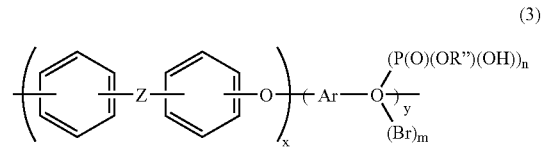
(3)

wherein -Z-, x, y, —Ar—, m and n have the same meaning as above, and R" represents hydrogen or an alkyl group.

The present invention also provides a process for producing an aromatic polymer phosphonic acid di-ester represented by the above formula (2), wherein the process comprises brominating an aromatic polymer compound represented by the formula (1),

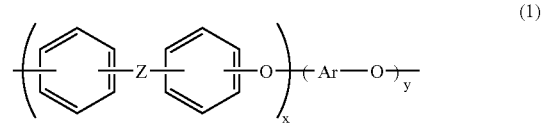
(1)

wherein -Z-, x, y and —Ar— have the same meaning as above, with a brominating agent, and acting thereon a trialkyl phosphite represented by the formula (4),

P(OR)(OR')(OR''') (4)

wherein R, R' and R''' each independently represent an alkyl group, in the presence of a nickel halide catalyst in an organic solvent; and additionally, a process for producing an aromatic polymer phosphonic acid mono-ester and/or a phosphonic acid of the free acid form represented by the above formula (3), which comprises hydrolyzing the di-ester; and also use of these aromatic polymer phosphonic acid derivatives.

Further, the present invention provides an industrially excellent process for brominating an aromatic polymer compound represented by the formula (1) with N-bromosuccinimide in the presence of a strong acid in an organic solvent.

DETAILED DESCRIPTION OF THE INVENTION

The aromatic polymer compound used in the invention is a compound represented by the above formula (1) wherein -Z- represents —$SO_2$— or —CO—, x and y respectively represent 0.01 to 0.99, provided that the sum of x and y is 1; —Ar— represents a divalent aromatic group having 4 to 18 carbon atoms which may contain hetero atom and said —Ar— may have one or more substituents.

Representative examples for —Ar— herein include the following divalent groups:

hydrocarbon divalent groups such as o-phenylene, m-phenylene, p-phenylene, naphthalene-1,4-diyl, naphthalene-1,5-diyl, naphthalene-2,6-diyl, naphthalene-2,3-diyl, biphenyl-4,4'-diyl, biphenyl-3,3'-diyl, p-terphenyl-4,4''-diyl, 2,2-diphenylpropane-4',4''-diyl, fluorene-2,7-diyl, fluorene-3,6-diyl and the like; and divalent groups containing hetero atom such as carbazole-2,7-diyl, carbazole-3,6-diyl, thiophene-2,5-diyl, dibenzothiophene-2,7-diyl, furan-2,5-diyl, dibenzofuran-2,7-diyl, dibenzofuran-3,6-diyl, diphenylamine-4,4'-diyl, diphenylether-4,4'-diyl and the like.

These groups may have one or more substituents; examples of the substituent include the following groups:

linear or branched alkyl groups which may be substituted with hydroxy or halogen, such as methyl, ethyl, 2-propyl, t-butyl, hydroxymethyl, trifluoromethyl and the like; linear or branched alkoxy groups which may be substituted with halogen, such as methoxy, ethoxy, trifluoromethoxy and the like; phenyl groups which may be substituted with alkyl, alkoxy, phenyl, phenoxy, halogen or sulfonic acid, such as phenyl, methylphenyl, methoxyphenyl, biphenyl, phenoxyphenyl, chlorophenyl, sulfophenyl and the like; phenoxy groups which may be substituted with alkyl, alkoxy or sulfonic acid, such as phenoxy, methylphenoxy, methoxyphenoxy, sulfophenoxy and the like; alkyloxycarbonyl groups such as ethoxycarbonyl; alkylcarbonyloxy groups such as ethylcarbonyloxy; aminocarboxy groups or N-alkylaminocarboxy groups; amino groups in which a nitrogen atom may be substituted with alkyl, such as amino group, dimethylamino group or the like; halogens such as fluorine, chlorine, bromine, iodine and the like; ureido group; acylamino group; carboxyl group; hydroxy group; cyano group; sulfonic acid group; aminosulfonyl group and the like.

Preferred examples of —Ar— in the present invention include phenylene groups which may be substituted, such as o-phenylene (1,2-phenylene), m-phenylene (1,3-phenylene), p-phenylene (1,4-phenylene), 3-methyl-1,2-phenylene, 3-ethyl-1,2-phenylene, 3-methoxy-1,2-phenylene, 3-ethoxy-1,2-phenylene, 3-bromo-1,2-phenylene, 3-chloro-1,2-phenylene, 3,6-dimethyl-1,2-phenylene, 4,5-dibromo-1,2-phenylene, 2-methyl-1,3-phenylene, 2-ethyl-1,3-phenylene, 2-methoxy-1,3-phenylene, 2-ethoxy-1,3-phenylene, 2-bromo-1,3-phenylene, 2-chloro-1,3-phenylene, 5-methyl-1,3-phenylene, 5-bromo-1,3-phenylene, 2-methyl-1,4-phenylene, 2-ethyl-1,4-phenylene, 2-methoxy-1,4-phenylene, 2-ethoxy-1,4-phenylene, 2-bromo-1,4-phenylene, 2-chloro-1,4-phenylene, 2,6-dimethyl-1,4-phenylene, 2,6-dibromo-1,4-phenylene, 2-phenyl-1,4-phenylene, 2,3-diphenyl-1,4-phenylene and the like;

biphenyldiyl groups which may be substituted, such as biphenyl-4,4'-diyl, biphenyl-3,3'-diyl, 3,3'-diphenylbiphenyl-4,4'-diyl, 3,3'-bisphenoxybiphenyl-4,4'-diyl, 3,3'-dichlorobiphenyl-4,4'-diyl, 3,3'-dibromobiphenyl-4,4'-diyl, 2,2'-dichlorobiphenyl-3,3'-diyl, 2,2'-dibromobiphenyl-3,3'-diyl, 4,4'-dichlorobiphenyl-3,3'-diyl, 4,4'dibromobiphenyl-3,3'-diyl and the like; carbazolediyl which may be substituted such as carbozole-2,2'-diyl, carbazole-3,3'-diyl, N-ethylcarbazole-2,2'-diyl, N-ethylcarbazole-3,3'-diyl and the like.

Among them, —Ar— is preferably phenylene groups which may be substituted or biphenyldiyl groups which may be substituted, and more preferably m-phenylene, p-phenylene, biphenyl-4,4'-diyl, biphenyl-3,3'-diyl and the like.

The symbols x and y mean molar ratios of the respective comonomers in a copolymer, used for the synthesis of the copolymer, and each of them represent a numerical value from 0.01 to 0.99, provided that the sum of x and y is 1.

Since the —Ar— moiety corresponding to y is usually more reactive to electrophilic substitution reaction, when y is higher, a copolymer having a higher degree of bromination as the whole is liable to be produced. Therefore, a higher rate of introduction for the phosphonic acid derivative groups can be obtained. Generally, by controlling y between 0.1 and 0.9, various properties of the copolymer can be adjusted within a desired range.

The aromatic polymer compound (1) may be either a random copolymer or an alternating copolymer or a block copolymer. These can be obtained according to known methods selecting respective corresponding monomers, ratio thereof and polymerization process.

The degree of polymerization thereof is not particularly limited and usually about 10 to $10^4$, or in molecular weight, usually about $10^3$ to $10^6$. When the degree of polymerization is less than 10, the mechanical strength is liable to be lowered, possibly raising a problem in film-forming performance. When the degree exceeds $10^4$, the solubility in solvents is liable to be lowered, possibly raising problems in performances for working and forming such as cast film process or the like. Therefore, the both cases are not preferred.

The step of brominating aromatic polymer compound (1) with a brominating agent is described below.

A brominated product of an aromatic polymer compound is useful as an intermediate for an ion-exchange resin, flame-retardant material, ion-conducting polymer, electron-conducting polymer and insulating material, because bromo group is easily substituted by other functional group as well known in the case of a brominated product of a low molecular weight aromatic compound.

AS a process for brominating an aromatic polymer compound, for example, hitherto known is a method of using bromine as a brominating agent (for example, Polymer, 1989, Vol.30, June, 1137–1142). By a method using bromine as a brominating agent, it is not easy to brominate an aromatic polymer compound relatively inactive to electrophilic substitution reaction. Even though iron type catalyst is used, there have been industrial problems of requiring long time or high temperature conditions.

In the present invention, the brominating step is usually performed by acting, a brominating agent such as bromine, N-bromosuccinimide or the like on an aromatic polymer compound (1), in an organic solvent. Examples of the organic solvent used here include methylene chloride, chloroform, carbon tetrachloride, acetic acid, a mixture thereof and the like. For the selection of the organic solvent, a preferred solvent has a dissolving capacity for the aromatic polymer compound (1) to be used as high as possible. The reaction can be carried out at room temperature up to the refluxing temperature of the solvent, and if necessary, under cooling below room temperature. In addition, a catalyst such as iron powders can be used.

A preferred process of brominating aromatic polymer compound provided by the present invention is described below.

The brominating agent is preferably N-bromosuccinimide and, in this case, it is preferred to co-exist a strong acid. Examples of the strong acid include mineral acids such as sulfuric acid, hydrochloric acid and the like and organic acids such as trifluoroacetic acid, with sulfuric acid being preferably used. In the ratio of the strong acid and the organic solvent, the organic solvent is ordinarily 0.3 to 20 times and preferably 5 to 10 times by weight of the strong acid. The amount of the mixed solvent is preferably 5 to 50 times by weight of the aromatic polymer compound, with particularly preferred amount being 10 to 30 times by weight. Solvent or mixture of solvents selected from halogenated methanes and halogenated ethanes are preferably used as organic solvent. Examples of the preferred solvent include methylene chloride, chloroform, carbon tetrachloride, dichloroethanes and trichloroethanes. Mixing can be carried out in any desired order. An allowable method is a method in which an aromatic polymer compound and N-bromosuccinimide as the brominating agent are added to a previously prepared mixture of an organic solvent and a strong acid. A preferred method is a method in which a strong acid, for example sulfuric acid, is gradually added to a solution or slurry of organic solvent containing an aromatic polymer compound and a brominating agent.

When N-bromosuccinimide is used, the bromination is usually carried out within a range of 0° C. to 30° C. When the reaction temperature is too high, sometimes sulfonation proceeds in the case wherein sulfuric acid is used as the strong acid.

When a brominating agent is used in much amount, the bromination degree becomes higher. But the bromination yield (yield of the amount of bromine consumed by the reaction with an aromatic polymer compound based on the amount of used bromine) depends on the nature of the aromatic polymer compound as a substrate.

Conventional methods can be used for collecting and purifying a brominated aromatic polymer compound. For example, the brominated aromatic polymer compound may be precipitated by adding a poor solvent or others and the desired product is collected by filtration or other means, followed by washing with water, re-precipitation purification with good solvent and poor solvent, and the like.

The degree of bromination of the aromatic polymer compound can be measured by any ordinary means such as NMR measurement, organic elementary analysis and so on.

According to the process of the present invention, bromination of an aromatic polymer compound can be conducted in relatively mild conditions, even in the case that the aromatic polymer compound hardly accept electrophilic substitution reactions and the bromination cannot proceed at all or can proceed only in a severe condition by conventional methods.

Next, the step of acting a trialkyl phosphite represented by the formula (4),

P(OR)(OR')(OR''')          (4)

wherein R, R' and R''' each independently represent an alkyl group, on the brominated aromatic polymer compound to give a phosphonic acid di-ester represented by the formula (2) is described.

This step is usually carried out in the presence of a nickel halide catalyst in organic solvent. The organic solvent used here is preferably an amide compound. Examples thereof include N,N-dimethylformamide, N,N-dimethylacetamide, N-methylpyrrolidone and the like. Among them, N,N-dimethylformamide is particularly preferred. For the selection of the organic solvent, preferable is a solvent in which a solubility of the brominated aromatic polymer compound used as the substrate is as high as possible. The organic solvent is usually used in about 3 to 100 times by weight of the brominated aromatic polymer compound. Preferably, the amount is about 4 to 20 times by weight.

As the nickel halide catalyst, compounds of nickel (II) are suitable, and particularly, nickel (II) chloride is preferably used. The amount of the nickel halide catalyst is usually used in about 1 to 3 times by mole to the amount of the bromo groups of the brominated aromatic polymer compound. Preferred amount is about 1.5 to 2 times by mole. When the amount is less than 1 time by mole, residual bromo group increases.

As the trialkyl phosphate (4), compounds with an alkyl moiety having 1 to 22 carbon atoms as R, R' or R''' are exemplified. Among them, preferred alkyl moiety is a straight chain or branched alkyl group having 4 or less carbon atoms. These alkyl moieties of R, R' and R''' may be the same or different. More preferred compounds are trimethyl phosphate, triethyl phosphate and the like. The trialkyl phosphite is used usually in about 1.2 to 2 times by mole to nickel halide and about 1.2 to 5 times by mole to the brominated aromatic polymer compound as bromine-reduced value.

The reaction is usually carried out by adding a brominated aromatic polymer compound and a nickel halide to an organic solvent, stirring the reaction mixture with heating until the mixture shows blue color and then adding a trialkyl phosphite. Preferably, the temperature for the reaction with trialkyl phosphite is 90° C. or above, and more preferably, it is the reflux temperature when N,N-dimethylformamide is used as the organic solvent. By adopting these conditions, the degree of conversion from bromo group to phosphonic acid di-ester can be improved.

While the reaction period depends on the kind of the brominated aromatic polymer compound, solvent, temperature and so on, exemplary period is usually within a range of about 1 to 24 hours when the reaction is conducted using N,N-dimethylformamide as the solvent under reflux.

In the collection and in the purification of the phosphonic acid di-ester (2) from the reaction mixture, conventional methods can be used. For example, the phosphonic acid di-ester (2) may be precipitated by adding a poor solvent and the desired product is collected by filtration, followed by washing with water, re-precipitation purification with good solvent and poor solvent.

Next, the step of producing a phosphonic acid mono-ester and/or a phosphonic acid represented by the formula (3) by hydrolyzing the phosphonic acid di-ester (2) is described.

The hydrolysis of the phosphonic acid di-ester (2) may be carried out after isolating said phosphonic acid di-ester from the reaction mixture or by subsequently adding an agent for hydrolysis to the reaction mixture. The method for hydrolysis may be carried out according to various known methods. For example, included are <1> a method in which an aqueous solution of sodium hydroxide, potassium hydroxide or the like and a phosphonic acid di-ester dissolved in an amide solvent or ether solvent are mixed and heated, <2> a method in which a trialkyl silyl halide such as trimethyl silyl iodide or the like is acted on a phosphonic acid di-ester (2), followed by hydrolysis with addition of water (Tetrahedron Lett., No. 2, 1977, 155–158, J. C. S. Chem. Comm., 1978, 870–871), and <3> a method in which the hydrolysis is carried out with an aqueous solution of an acid and others. In the method <1>, a mono-hydrolysis product of the di-ester (R" is alkyl, a mono-ester of phosphonic acid) is mainly produced, and in the methods <2> and <3>, a phosphonic acid (R" is hydrogen) is mainly obtained.

As an example of the hydrolysis method <1> exemplified is a method in which an aqueous solution containing 1 mole or more, usually large excess, of an alkali, as the phosphonic acid ester group-reduced value, and a mixed solution containing a phosphonic acid di-ester (2) dissolved or partially dissolved in an amide solvent or ether solvent are mixed in such manner that the phosphonic acid di-ester (2) is at least partially dissolved, and the mixture is brought to its refluxing temperature for hydrolysis.

Additionally, as an example of the hydrolysis method <2>, exemplified is a method in which a mixed solution containing a phosphoric acid di-ester (2) dissolved or partially dissolved in an amide solvent or ether solvent is cooled to about −50° C. to room temperature, about 2 to 10 times by mole of a trialkyl silyl halide, as the phosphonic acid-reduced value, is added thereto, followed by incubation at about 0 to 100° C., by addition of water, and by incubation at 0 to 100° C. Of course, the product obtained by reacting the trialkyl silyl halide may be once isolated and hydrolyzed in water or a mixed solution of water and organic solvent.

Furthermore, as an example of the hydrolysis method <3>, exemplified is a method in which a mixed solution containing a phosphonic acid di-ester (2) dissolved or suspended in the form of a slurry in a solvent containing aqueous hydrochloric acid is stirred at room temperature to refluxing temperature, preferably at 80° C. to refluxing temperature. Examples of the solvent containing aqueous hydrochloric acid include 10 to 35% aqueous hydrochloric acid solution and a mixed solvent consisting of said aqueous solution and another solvent. Another solvent includes aprotic solvent such as alcohols, ketones, dimethylsulfoxide, N,N-dimethylformamide and the like.

The produced phosphonic acid mono-ester and/or phosphonic acid represented by the formula (3) can be isolated from the reaction mixture by conventional methods. For example, the desired product may be isolated by adding poor solvent or others to precipitate phosphonic acid derivative and collecting by filtration or other means. If necessary, the product can be purified by routine methods such as washing with water, re-precipitation purification with good solvent and poor solvent, and the like.

And the produced phosphonic acid mono-ester and/or phosphonic acid represented by the formula (3) may be a salt or a partial salt. In this case, possible cation includes alkali metal ions and alkaline earth metal ions, with lithium, sodium and potassium being particularly preferred.

The phosphonic acid di-ester represented by the formula (2) as well as the phosphonic acid mono-ester and/or phosphonic acid represented by the formula (3) desired in the present invention can be obtained in such manner and these aromatic polymer phosphonic acid derivatives are useful as materials for solid polymer type fuel cell such as polymer electrolyte.

For use of the aromatic polymer phosphonic acid derivatives of the invention in a fuel cell, it is usually used in the form of membrane. Methods for converting the aromatic polymer phosphonic acid derivative of the invention to a polymer electrolyte membrane are not particularly limited. A preferred method is a film-forming method from a solution (solvent-casting method).

Specifically, a polymer electrolyte membrane is prepared by dissolving an aromatic polymer phosphonic acid derivative (2) or (3) of the invention in an appropriate solvent, applying the solution on a glass plate by flowing it, and removing the solvent. The solvent for use in the film-forming is not particularly limited as far as it can dissolve the aromatic polymer phosphonic acid derivative and can be removed afterwards. Suitable solvent includes aprotic polar solvents such as N,N-dimethylformamide, N,N-dimethylacetamide, N-methyl-2-pyrrolidone, dimethylsulfoxide and the like; chlorinated solvents such as dichloromethane, chloroform, 1,2-dichloroethane, chlorobenzene, dichlorobenzene and the like; alcohols such as methanol, ethanol, propanol and the like; alkylene glycol monoalkyl ethers such as ethylene glycol monomethyl ether, ethylene glycol monoethyl ether, propylene glycol monomethyl ether, propylene glycol monoethyl ether and the like. These can be used independently or in a mixture of two or more of solvents, if necessary. Among them, dimethylformamide, dimethylacetamide, N-methylpyrrolidone, dimethylsulfoxide and the like are preferred because of high solubility of polymers.

For use of the aromatic polymer phosphonic acid derivative of the invention in a fuel cell, it can be used in the form of a polymer electrolyte complex film obtained by complexing the aromatic polymer phosphonic acid derivative with a support.

The support here acts as a body for impregnating the aromatic polymer phosphonic acid derivative and principally used for additional improvement of strength, softness and durability of the aromatic polymer phosphonic acid derivative. Therefore, any material, such as fibril form, porous film form and the like, can be used irrespective of its shape and quality as far as it can attain the above purpose. Bearing in mind the good use as a separator membrane in a solid polymer electrolyte type fuel cell, use of a porous film is particularly effective.

The shape of the porous film usable in such purpose includes a film thickness usually of 1 to 100 μm, preferably of 3 to 30 μm, more preferably of 5 to 20 μm, a pore diameter usually of 0.01 to 10 μm, preferably of 0.02 to 7 μm, and a porosity usually of 20 to 98%, preferably of 30 to 95%. When the film thickness of the porous support is too small, the reinforcing effect after complexing or the effect affording softness or durability becomes insufficient and become liable to cause gas leak (cross leak). On the other hand, when the film thickness is too large, the electric resistance becomes high and the obtained complex film is not preferred as a separating membrane for solid polymer type fuel cell. When the pore diameter is too small, impregnation of a polymer solid electrolyte becomes very difficult, and when it is too large, there is a tendency to lower the reinforcing effect to a solid polymer electrolyte. When the porosity is too small, the resistance as a solid electrolyte membrane becomes great, and when it is too large, the strength of the porous film itself generally becomes weak and the reinforcing effect becomes low.

The materials for the porous support film are preferably aliphatic polymers or fluorine-containing polymers, in view of heat resistance and reinforcing effect on the mechanical strength.

Suitable aliphatic polymers includes, without limitation, polyethylene, polypropylene, ethylene-propylene copolymer and the like. The polyethylene here refers to an ethylene based polymer having a polyethylene crystal structure and includes, for example, a copolymer of ethylene and another monomer. Specifically included are copolymers of ethylene and an α-olefin, called linear low density polyethylene (LLDPE). The polypropylene here refers to a polypropylene polymer having a polypropylene crystal structure and includes generally used propylene block copolymers, random copolymers (these are copolymers with ethylene or 1-butene) and the like.

In addition, the fluorine-containing polymers refer to known thermoplastic resins having at least one carbon-fluorine bond in the molecule. Usually, suitably usable compound has a structure in which the all or a major part of hydrogen atoms in an aliphatic polymers are replaced by fluorine atoms.

Suitable examples of the fluorine-containing polymers include, without limitation, polytrifluoroethylene, polytetrafluoroethylene, polychlorotrifluoroethylene, poly(tetrafluoroethylene-hexafluoropropylene), poly(tetrafluoroethylene-perfluoroalkylether), polyvinylidene fluoride and the like. Among them, polytetrafluoroethylene and poly(tetrafluoroethylene-hexafluoropropylene) are preferred and polytetrafluoroethylene is particularly preferred in the invention. In view of the mechanical strength, these fluorine resins preferably have an average molecular weight of 100,000 or more.

For use of the membrane or the complex film comprising the aromatic polymer phosphonic acid derivative of the invention in a fuel cell, the film thickness is not particularly limited and is preferably 3 to 200 μm, more preferably 4 to 100 μm, furthermore preferably 5 to 50 μm. When the film thickness is too small, there is a tendency that the film strength becomes low. On the other hand, when the film thickness is too large, the electric resistance becomes high and the film is not preferred as a separating membrane for solid polymer type fuel cell. The film thickness can be controlled by appropriately selecting the concentration of a polymer electrolyte solution, the coating amount of a polymer electrolyte solution, the thickness of a porous support film and the coating thickness thereof on a porous support film.

Furthermore, additives such as antioxidant can be contained as far as the purpose of the invention is not injured.

EXAMPLES

The invention will now be described in more detail with reference to Examples, which should not be construed as a limitation upon the invention.

Example 1

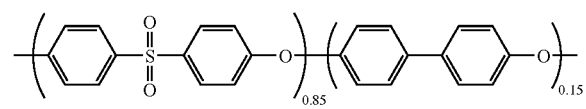

Into a 500 ml flask equipped with a mechanical stirrer were charged 15.0 g of a random copolymer (polystyrene-reduced molecular weight: Mn=1.5×10$^4$, Mw=3.2×10$^4$, obtainable by reacting 4,4'-dichlorodiphenyl sulfone, 4,4'-dihydroxydiphenyl sulfone and 4,4'-biphenol according to a known method, for example JP-A-59-74128, JP-A-10-21943) having the above-described structure (containing 10.1 mmol of unit derived from 4,4'-biphenol), 3.62 g (20.3 mmol) of N-bromosuccinimide and 200 ml of methylene chloride. The mixture was stirred under nitrogen atmosphere. Under ice cooling, 20.0 g of concentrated sulfuric acid was added dropwise to this suspension over 30 minutes. As the result, a sea-laver like product began to precipitate halfway. After completion of addition, the reaction mixture was stirred for three hours under ice cooling, poured into ice water and stirred after addition of a small amount of sodium sulfite. The mixture was neutralized by aqueous sodium hydroxide solution, then concentrated with a rotary evaporator under reduced pressure and the obtained aqueous slurry was filtrated. The cake was repeatedly washed with water and then dried under reduced pressure. Elementary analysis of the obtained polymer revealed that about 1.8 atoms of Br was substituted per one unit derived from 4,4'-biphenol.

Elementary Analysis, Found: C, 58.0%; H, 3.2%; S, 11.0%; Br, 8.5%

Calculated for 1.8 Br Substitution: C, 59.1%; H, 3.2%; S, 11.2%; Br, 8.8%

Example 2

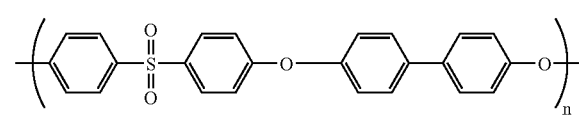

Into a 500 ml flask equipped with a mechanical stirrer were charged 15.0 g of an alternating copolymer (polystyrene-reduced molecular weight: Mn=3.0×10$^4$, Mw=6.8×10$^4$, manufactured by Aldrich Chem. Co., Ltd.) having the above-described structure (containing 37.5 mmol of unit derived from 4,4'-biphenol), 35.0 g (197 mmol) of N-bromosuccinimide and 202 g of methylene chloride. The mixture was stirred under nitrogen atmosphere. Under ice cooling, 99.6 g of concentrated sulfuric acid was added dropwise to this suspension over 75 minutes. As the result, a sea-laver like product began to precipitate halfway. After completion of addition, the reaction mixture was stirred for one and half hour under ice cooling, poured into ice water and stirred after addition of a small amount of sodium sulfite. The mixture was concentrated with a rotary evaporator under reduced pressure and the obtained aqueous slurry was filtrated. The cake was repeatedly washed with water inserting neutralization treatment and then dried under reduced pressure. Elementary analysis of the obtained polymer revealed that about 2.1 atoms of Br was substituted per one unit derived from 4,4'-biphenol.

Elementary Analysis, Found: C, 46.7%; H, 2.6%; S, 5.4%; Br, 29.1% Calculated for 2.1 Br Substitution: C, 50.9%; H, 2.5%; S, 5.6%; Br, 29.6%

Example 3

Into 183 g of N,N-dimethylformamide was dissolved 7.0 g of the brominated polymer (bromo group content: 26.0 mmol) obtained in Example 2. To this was added 5.11 g (39.4 mmol) of nickel (II) chloride and the mixture was stirred under nitrogen atmosphere. The mixture was heated and then 7.71 g (46.4 mmol) of triethyl phosphite was added dropwise thereto at an oil-bath temperature of 130° C. over 10 minutes. The temperature was elevated up to the refluxing temperature over 20 minutes and, after one and half hour, 2.66 g (16.0 mmol) of triethyl phosphite was additionally added dropwise thereto. After stirring further 2 hours under reflux, the reaction mixture was poured into ice water and filtered. The cake was washed with diluted hydrochloric acid, with repeating water, with diluted aqueous sodium hydrogen carbonate solution for neutralization and lastly with water. Upon drying under reduced pressure, 5.63 g of polymer phosphonic acid diethyl ester was obtained. Hereinafter, the polymer is referred to as (P1).

$^1$H-NMR (300 MHz, DMSO-d6): 0.8 ppm (methyl), 3.6 ppm (methylene), 7.0–7.4 ppm (aromatic hydrogen), 7.6–8.2 ppm (aromatic hydrogen).

Example 4

To 80 ml of N,N-dimethylformamide was added 5.43 g of the polymer phosphonic acid diethyl ester obtained in Example 3. Upon stirring with heating under nitrogen atmosphere, a starch syrup-like mixture was formed. A solution formed by dissolving 8.1 g of potassium hydroxide in 41 g of water was added at 100° C. and then the mixture was stirred for 8 hours with heating under reflux. After cooling, the reaction mixture was poured into ice water to cause precipitation of a polymer. Diluted hydrochloric acid was added to the slurry adjusting pH to 1. After filtration, the polymer was repeatedly washed with water. Drying under reduced pressure gave 4.62 g of dried polymer, which was dissolved in N,N-dimethylformamide, re-precipitated by adding a large excess of 10% hydrochloric acid and filtered. The cake was repeatedly washed with water and dried under reduced pressure to give 4.08 g of a polymer. Analysis of the polymer revealed that the polymer had a unit structure (about 0.2 atoms of Br and about 1.4 groups of monoethyl phosphonate were substituted per one unit derived from 4,4'-biphenol) represented by the following structure. Hereinafter, the polymer is referred to as (P2).

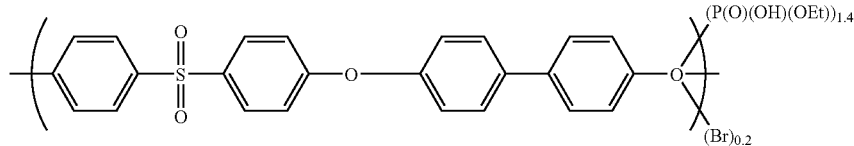

Elementary Analysis: P: Found, 7.2% (Calculated, 7.6%) Br: Found, 3.1% (Calculated, 2.8%)

$^1$H-NMR (300 MHz, DMSO-d6): 1.0 ppm (methyl), 3.9 ppm (methylene), 7.1–8.1 ppm (aromatic hydrogen).

Example 5

To 200 ml of 21% aqueous hydrochloric acid solution was added 10.2 g of the polymer phosphonic acid diethyl ester produced according to Examples 2 and 3, and the mixture was stirred for 8 hours with heating under refluxing under nitrogen atmosphere.

The suspension was allowed to cool, filtered, washed with water and dried in vacuum. The obtained crude product was dissolved in N,N-dimethylformamide and a large excess of 5% hydrochloric acid was added to the obtained solution to cause re-precipitation. The cake was filtered, repeatedly washed with water and dried under reduced pressure to give 9.1 g of a polymer. Analysis of the polymer revealed that the polymer had a unit structure (about 0.1 atoms of Br and about 1.3 groups of phosphonic acid were substituted per one unit derived from 4,4'-biphenol) represented by the following structure. By calculation, 2.55 mmol of P atom was present per 1 g of the polymer and the ion exchange capacity was 5.1 meq/g. Hereinafter, the polymer is referred to as (P3).

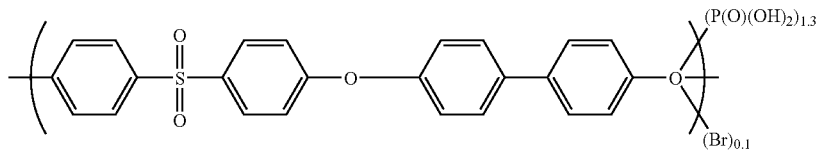

Elementary Analysis: P: Found, 7.6% (Calculated, 7.9%) Br: Found, 1.3% (Calculated, 1.6%)

$^1$H-NMR (300 MHz, DMSO-d6): 7.0-8.2 ppm (aromatic hydrogen).

Example 6

To 50 ml of N,N-dimethylformamide was added 2.0 g of the polymer phosphonic acid diethyl ester produced according to Example 3, and the mixture was stirred at room temperature in an argon atmosphere. After cooling, 7.17 g (35.7 mmol) of trimethylsilyl iodide was added dropwise at −40° C. over 7 minutes. The temperature was elevated to room temperature over 20 minutes, and after 30 minutes, heated to 80° C. of an oil-bath temperature. The mixture was stirred at an oil-bath temperature of 60° C. for 5 hours, and then cooled to room temperature. After adding 4 ml of water to the reaction mixture and stirring for 2 hours, the solvent was removed by distillation. The product was dissolved in dimethylsulfoxide and poured into 5% hydrochloric acid to cause re-precipitation. The cake was filtered, repeatedly washed with water and dried under reduced pressure to give 1.42 g of a polymer. The product had substantially the same structure as (P3) obtained in Example 5.

$^1$H-NMR (300 MHz, DMSO-d6): 7.0–8.2 ppm (aromatic hydrogen).

Comparative Example 1

[Polymer Compound (P4) in Which Phosphonic Acid Derivative Group is Bound to an Aromatic Ring Through a Methylene Group]

A polymer having a unit structure represented by the following formula was obtained according to J. Appl. Poly. Sci., 18, 1974 (1969). By calculation, 5.16 mmol of P atom was present per 1 g of the polymer. Hereinafter, the polymer is referred to as (P4).

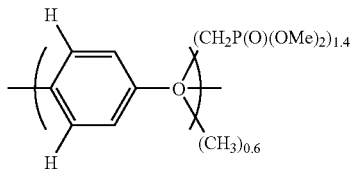

$^1$H-NMR (300 MHz, CDCl$_3$): 2.1 ppm (Ar—CH$_3$), 3.0 ppm (—CH$_2$—P), 3.6 ppm (—OCH$_3$), 6.7–7.1 ppm (Ar—H).

Examples 7 and 8 and Comparative Example 2

[Evaluation of Radical Resistance]

Polymers obtained in Examples and Comparative Example were subjected to cast film process. The obtained films were assayed for radical resistance and the results are shown in Table 1.

Radical resistance (oxidation resistance) was evaluated by immersing a polymer film in an aqueous solution containing 3% of hydrogen peroxide and 0.25 ppm of iron (II) chloride (0.11 ppm of Fe$^{2+}$) at 90° C. for 20 minutes and measuring the change in shape of the film.

While the film obtained from (P4) in Comparative Example 1 showed great change in shape of the film, the films obtained from the aromatic polymer phosphonic acid derivatives of the invention showed no change in shape and exhibited a good durability.

TABLE 1

| Example | Polymer | Dimension before treatment | Dimension after treatment | Appearance |
|---|---|---|---|---|
| Example 7 | P1 | 5 cm × 7 cm | No change | No change |
| Example 8 | P3 | 5 cm × 6 cm | No change | No change |
| Comparative example 2 | P4 | 5 cm × 5 cm | 1 cm × 2.5 cm | Massive shrink |

The present invention provides a process for brominating an aromatic polymer compound in relatively mild conditions, even in the case that the aromatic polymer compound hardly accept electrophilic substitution reactions by conventional methods. The present invention also provides an aromatic polymer phosphonic acid derivative in which phosphonic acid derivative group or the like is directly bound to aromatic ring.

The aromatic polymer phosphonic acid derivatives of the invention are useful as materials for solid polymer type fuel cell and particularly excellent in radical resistance.

What is claimed is:

1. An aromatic polymer phosphonic acid derivative, which is represented by the formula (2),

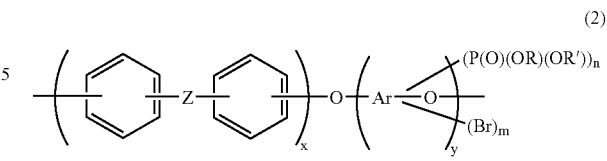

wherein —Z— represents —SO$_2$— or —CO—, x and y are average molar ratios in the polymer and respectively represent 0.01 to 0.99, provided that the sum of x and y is 1; —Ar— represents a phenylene group or a biphenyldiyl group, and said —Ar— may have one or more substituents; R and R' each independently represent an alkyl group; m and n independently represent an average number of substituents per unit structure (—Ar—O—) of an aromatic polymer compound (1),

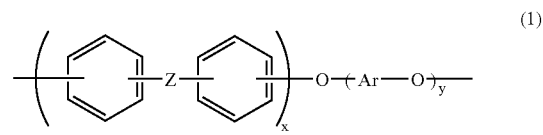

m is 0 to 8, n is a positive number of 8 or less, and the sum of m and n is 8 or less; or an aromatic polymer phosphonic acid derivative whose free acid form is represented by the formula (3):

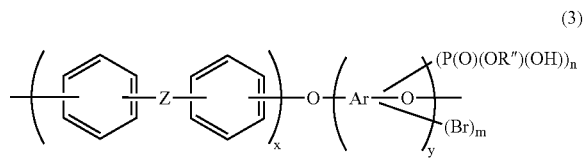

wherein —Z—, x, y, —Ar—, m and n have the same meaning as above, and R" represents hydrogen or an alkyl group.

2. A polymer electrolyte comprising, as an active ingredient, an aromatic polymer phosphonic acid derivative represented by the formula (2) and/or an aromatic polymer phosphonic acid derivative of the free acid form represented by the formula (3) according to claim 1.

3. A polymer electrolyte membrane in which the polymer electrolyte according to claim 2 is used.

4. A process for producing an aromatic polymer phosphonic acid derivative represented by the formula (2) according to claim 1, wherein the process comprises brominating an aromatic polymer compound represented by the formula (1):

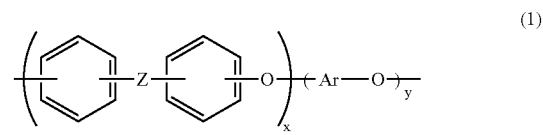

wherein —Z— represents —SO$_2$— or —CO—, x and y are average molar ratios in the polymer and respectively represent 0.01 to 0.99, provided that the sum of x and y is 1; —Ar— represents a phenylene group or a biphenyldiyl group, and said —Ar— may have one or more substituents, with a brominating agent, and acting thereon a trialkyl phosphate represented by the formula (4):

wherein R, R' and R'" each independently represent an alkyl group, in the presence of a nickel halide catalyst in an organic solvent.

5. A process for producing an aromatic polymer phosphonic acid derivative of the free acid form represented by the formula (3) according to claim 1, wherein the process comprises brominating an aromatic polymer compound represented by the formula (1) with a brominating agent,

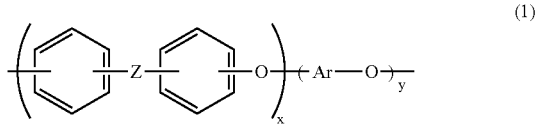

wherein —Z— represents —SO$_2$— or —CO—, x and y are average molar ratios in the polymer and respectively represent 0.01 to 0.99, provided that the sum of x and y is 1; —Ar— represents a phenylene group or a biphenyldiyl group, and said —Ar— may have one or more substituents, and acting thereon a trialkyl phosphate represented by the formula (4):

P(OR)(OR')(OR''') (4)

wherein R, R' and R'" each independently represent an alkyl group, in the presence of a nickel halide catalyst in an organic solvent to give an aromatic polymer phoshonic acid derivative represented by the formula (2),

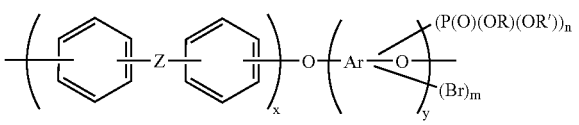

wherein —Z—, x, y, —Ar—, R and R' have the same meanings defined above; m and n independently represent an average number of substituents per unit structure (—Ar—O—) of an aromatic polymer compound (1),

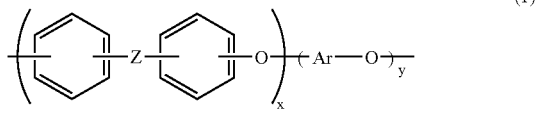

m is 0 to 8, n is a positive number of 8 or less, and the sum of m and n is 8 or less, and then hydrolyzing said acid derivative.

6. The process according to claim 4 or 5, wherein nickel chloride (II) is used as the nickel halide.

7. The process according to claim 4 or 5, wherein an amide compound is used as the organic solvent.

8. The process according to claim 4 or 5, wherein at least one compound selected from the group consisting of trimethyl phosphite and triethyl phosphite is used as the trialkyl phosphate.

9. A process for producing an aromatic polymer phosphonic acid derivative of the free acid form represented by the formula (3) according to claim 1, wherein the process comprises hydrolyzing the aromatic polymer phosphonic acid derivative represented by the formula (2):

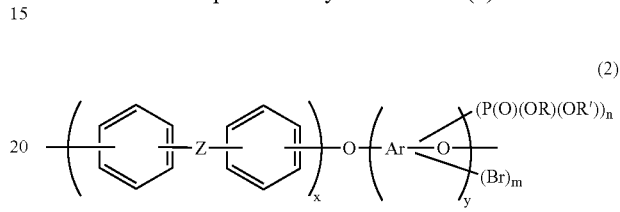

wherein —Z— represents —SO$_2$— or —CO—, x and y are average molar ratios in the polymer and respectively represent 0.01 to 0.99, provided that the sum of x and y is 1; —Ar— represents a phenylene group or a biphenyldiyl group, and said —Ar— may have one or more substituents; R and R' each independently represent an alkyl group; m and n independently represent an average number of substituents per unit structure (—Ar—O—) of an aromatic polymer compound (1),

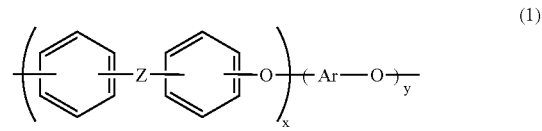

m is 0 is 8, n is a positive number of 8 or less, and the sum of m and n is 8 or less.

10. The process according to claim 5 or 9, wherein the hydrolysis is carried out in the presence of an alkali.

11. The process according to claim 5 or 9, wherein the hydrolysis is carried out in the presence of an acid.

12. The process according to claim 5 or 9, wherein the hydrolysis is carried out after acting a trialkyl silyl halide on the phosphonic acid di-ester.

13. The process according to claim 4 or 5, wherein the aromatic polymer compound represented by the formula (1) is brominated with N-bromosuccinimide in the presence of a strong acid in an organic solvent.

14. The process according to claim 13, wherein the strong acid is sulfuric acid.

15. The process according to claim 13, wherein the organic solvent contains at least one selected from halogenated methanes and halogenated ethanes.

* * * * *